(12) United States Patent
Matsuda et al.

(10) Patent No.: US 6,985,562 B1
(45) Date of Patent: Jan. 10, 2006

(54) PORTABLE ELECTRONIC APPARATUS HAVING A TELEPHONING FUNCTION

(75) Inventors: Youzou Matsuda, Nara (JP); Shirayuki Araki, Katano (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/321,204

(22) Filed: May 27, 1999

(30) Foreign Application Priority Data

May 28, 1998 (JP) ............................. 10-146938
Apr. 7, 1999 (JP) ............................. 11-099588

(51) Int. Cl.
*H04M 1/64* (2006.01)
*H04M 1/00* (2006.01)

(52) U.S. Cl. .................... 379/88.06; 455/550.1; 455/566

(58) Field of Classification Search .. 379/88.05–88.06, 379/88.14, 157; 455/414.1, 414.4, 550.1–566
See application file for complete search history.

(56) References Cited

U.S. PATENT DOCUMENTS

| | | | |
|---|---|---|---|
| 5,043,760 A * | 8/1991 | MacLellan et al. .......... 399/343 |
| 5,305,374 A * | 4/1994 | Snyder ..................... 379/88.06 |
| 5,386,459 A * | 1/1995 | Veeneman et al. ........ 379/93.01 |
| 5,436,436 A * | 7/1995 | Matsukawa ................. 235/380 |
| 5,732,349 A * | 3/1998 | Sanpei et al. ............. 455/435.1 |
| 5,774,537 A * | 6/1998 | Kim ............................ 379/157 |
| 5,841,852 A * | 11/1998 | He ......................... 379/207.15 |
| 5,943,398 A * | 8/1999 | Klein et al. ............... 379/88.13 |
| 5,946,376 A * | 8/1999 | Cistulli ..................... 379/88.06 |
| 5,966,685 A * | 10/1999 | Flanagan et al. .............. 704/8 |
| 5,982,856 A * | 11/1999 | Cohn et al. ............... 379/88.06 |
| 6,069,939 A * | 5/2000 | Fung et al. ................. 379/67.1 |
| 6,097,806 A * | 8/2000 | Baker et al. ................. 379/265 |
| 6,167,287 A * | 12/2000 | Chozui ....................... 455/566 |
| 6,223,059 B1 * | 4/2001 | Haestrup .................... 455/566 |
| 6,233,317 B1 * | 5/2001 | Homan et al. ........... 379/88.05 |
| 6,240,170 B1 * | 5/2001 | Shaffer et al. ......... 379/142.15 |
| 6,308,087 B1 * | 10/2001 | Aoshima .................... 455/575 |
| 6,313,735 B1 * | 11/2001 | Higuchi ..................... 340/7.54 |
| 2002/0015479 A1 * | 2/2002 | Dybedokken et al. ... 379/88.06 |
| 2002/0022498 A1 * | 2/2002 | Hokao ........................ 455/556 |
| 2002/0181669 A1 * | 12/2002 | Takatori et al. .......... 379/88.06 |
| 2003/0078033 A1 * | 4/2003 | Sauer et al. ................ 455/412 |

FOREIGN PATENT DOCUMENTS

| | | | |
|---|---|---|---|
| JP | 5-219280 A | | 8/1993 |
| JP | 09-172658 | * | 6/1997 |
| JP | 9-172658 A | | 6/1997 |

* cited by examiner

*Primary Examiner*—Fan Tsang
*Assistant Examiner*—Joseph T Phan
(74) *Attorney, Agent, or Firm*—Nixon & Vanderhye, PC

(57) ABSTRACT

A portable electronic apparatus having a telephoning function receives country or area data to be set therein through an infrared communication controller 19 and an infrared communication device 20, and stores the data in a flash ROM. The country or area initial data corresponding to the data stored in the flash ROM is selected from a database including various kinds of initial data stored in a ROM to cope with a plurality of countries or areas, and the selected initial data is used to initialize software.

7 Claims, 14 Drawing Sheets

FIG.8

Country & Language
USA & English:

| Country |
| Language |
| |
| Personal Modification |
| |
| |

FIG.9

Country:USA

| FRANCE |
| GABON |
| GAMBIA |
| GEORIA |
| GERMANY |
| GHANA |
| GUAM |

FIG. 23
FIG. 24
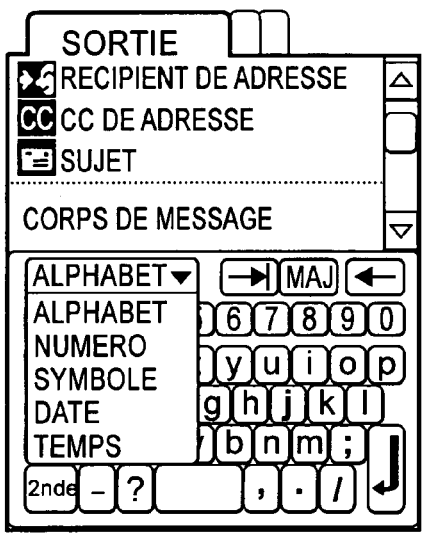
FIG. 25

PORTABLE ELECTRONIC APPARATUS HAVING A TELEPHONING FUNCTION

BACKGROUND OF INVENTION

1. Field of the Invention

The present invention relates to a portable electronic apparatus having a telephoning function.

2. Description of the Prior Art

Conventionally, a portable electronic apparatus having a telephoning function is often equipped, for example, for a communications service such as electronic mail (hereafter also e-mail, or simply mail).

To use e-mail, which is one of functions for which such a portable electronic apparatus having a telephoning function is typically equipped, it is necessary to previously set a telephone number to a networking service provider, templates of text, and other data. Typical settings for such data are usually factory-programmed in such a way that they can be altered as desired when the user starts using a networking service.

However, typical settings for e-mail often vary from one country or area to another, and templates of text need to be prepared in different languages for different countries or areas. Conventionally, to cope with such variations from one country or area to another, different units are manufactured for use in different countries or areas. Note that, here, a "language" denotes the language used for daily social communication among the people of a particular country or area.

Japanese Laid-Open Patent Application No. H5-219280 proposes a technique of automatically setting country/area data by checking the voltage or circuit of commercial AC power instead of demanding the user to set country/area data to determine initial data. However, this method is not practicable in, for example, a battery-operated apparatus that does not use commercial AC power, and does not allow discrimination between areas that cannot be distinguished on the above-mentioned basis.

SUMMARY OF THE INVENTION

An object of the present invention is to provide a telephoning-function-incorporating portable electronic apparatus that allows discrimination among more areas than can be distinguished on the basis of commercial AC power and that allows initialization of software-related settings as well as of display-related settings.

Another object of the present invention is to provide a telephoning-function-incorporating portable electronic apparatus in which the settings edited through such initialization by the user are kept unerased even when the power to the apparatus is turned off.

To achieve the above objects, according to one aspect of the present invention, a portable electronic apparatus incorporating software and having a telephoning function is provided with: a first memory for storing a plurality of sets of initial data for the software to cope with various kinds of area data and languages; input means for allowing entry of the area data and the language of the area in which the portable electronic apparatus is used; and a second memory for storing the area data and the language entered through the input means. Here, when the software is initialized, the initial data corresponding to the area data and the language stored in the second memory is selected from the initial data stored in the first memory.

According to this configuration, for example prior to shipment of the portable electronic apparatus, the area data and the language of the area to which it is going to be shipped is entered in it through the input means, so that the area data and the language are stored in the second memory. In accordance with the area data and the language thus entered, the corresponding initial data for the software is read out from the first memory, and the software is initialized by the use of this initial data.

According to another aspect of the invention, the portable electronic apparatus incorporating software and having a telephoning function may be further provided with: editing means for allowing the selected initial data to be edited by the user; and storing means for storing the initial data edited by the user in the second memory.

According to this configuration, for example when the user starts using the portable electronic apparatus, and the user wishes to alter the initial data that is already entered in it prior to shipment as described above, the user can edit the initial data. Moreover, the initial data as edited by the user is stored in the second memory, and therefore, as long as the second memory is a non-volatile memory such as a flash ROM the edited initial data is kept unerased even when the power to the apparatus is turned off.

According to another aspect of the present invention, the portable electronic apparatus incorporating software and having a telephoning function may be further provided with: a key that is operated to delete the initial data edited by the user.

According to this configuration, simply by pressing the key to be pressed to delete the initial data edited by the user, it is possible to delete the initial data edited by the user.

According to another aspect of the present invention, the portable electronic apparatus incorporating software and having a telephoning function may be so designed that, when the key that is operated to delete the initial data edited by the user is operated, the initial data edited by the user is deleted and the software of the portable electronic apparatus having the telephoning function is initialized by the use of the initial data corresponding to the area data and the language as initially set.

According to this configuration, simply by pressing the key to be pressed to delete the initial data edited by the user, it is possible to delete the initial data edited by the user and initialize the software by the use of the initial data as set prior to shipment.

According to another aspect of the present invention, the portable electronic apparatus incorporating software and having a telephoning function may be so designed that, when the software of the portable electronic apparatus having the telephoning function is initialized by the use of the initial data corresponding to the area data and the language as edited by the user, the initial data is checked so that, if incorrect data is found therein, the initial data edited by the user is automatically deleted and the software of the portable electronic apparatus having the telephoning function is initialized by the use of the initial data corresponding to the area data and the language as initially set.

According to this configuration, for example when the initial data edited by the user has not been stored properly in the second memory because of an accident such as a drop in the supplied voltage, incorrect data is automatically detected. Then, to prevent malfunctioning of the portable electronic apparatus having the telephoning function, the initial data edited by the user is automatically deleted, and the software is initialized by the use of the initial data as set prior to shipment.

BRIEF DESCRIPTION OF THE DRAWINGS

This and other objects and features of the present invention will become clear from the following description, taken in conjunction with the preferred embodiments with reference to the accompanying drawings in which:

FIG. 8 is a diagram showing a first example of the operation screen (in English) for area setting, language setting, and user editing, common to all of the embodiments of the invention;

FIG. 9 is a diagram showing a first example of the operation screen (in English) for area setting, common to all of the embodiments of the invention;

FIG. 23 is a diagram showing a second example of the outgoing mail creation screen (in French) selected according to the area setting, language setting, and user editing actually made, common to all of the embodiments of the invention;

FIG. 24 is a diagram showing a second example of the data-entry software key selection screen (in French) selected according to the area setting, language setting, and user editing actually made, common to all of the embodiments of the invention;

FIG. 25 is a diagram showing a third example of the outgoing mail creation screen (in French) selected according to the area setting, language setting, and user editing actually made, common to all of the embodiments of the invention;

DESCRIPTION OF THE PREFERRED EMBODIMENTS

First Embodiment

Figure 1:
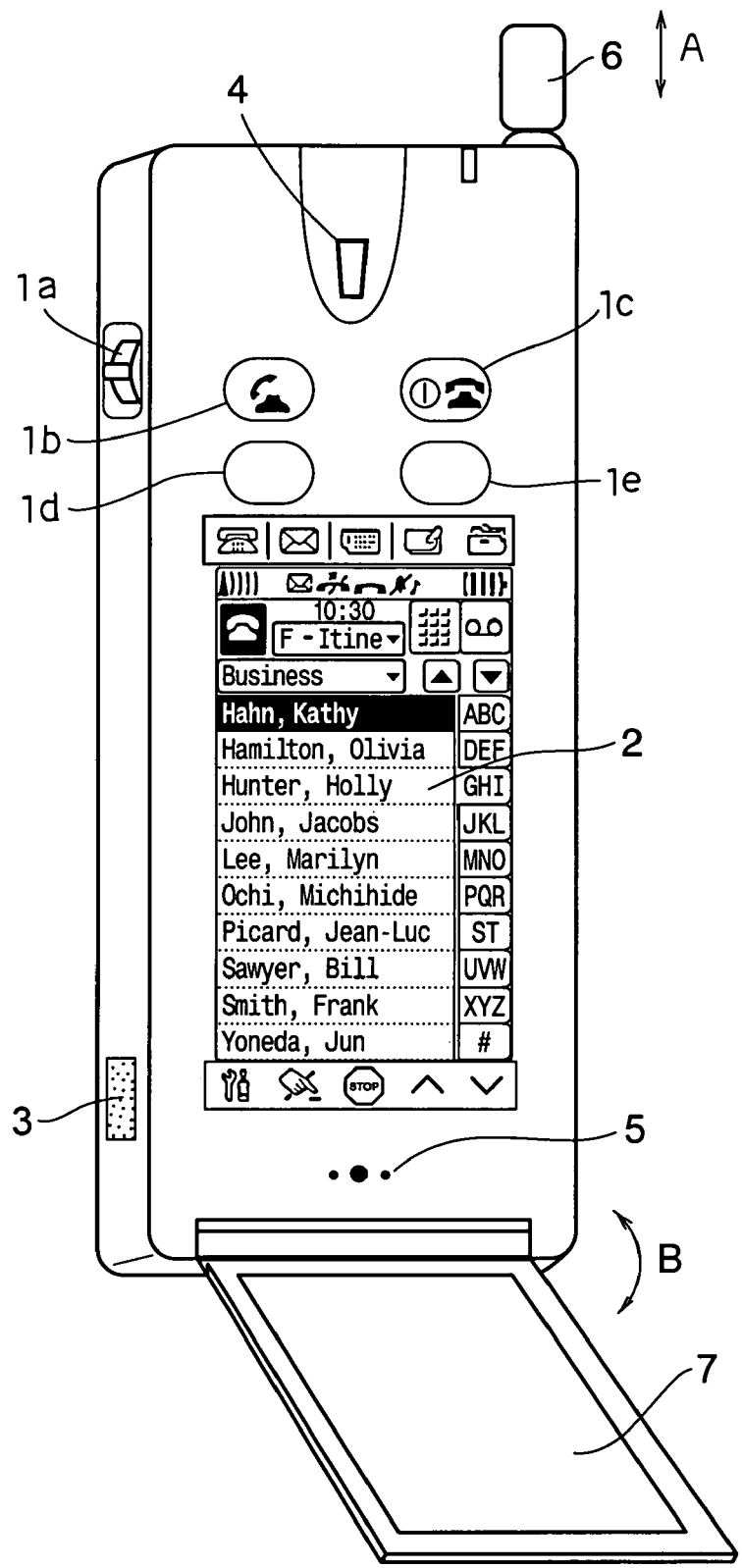
FIG. 1 is a diagram showing the appearance of a portable electronic apparatus having a telephoning function employed in all embodiments of the invention.

Hereinafter, a first embodiment of the present invention will be described with reference to FIGS. 1, 2, 3, 4, 8, 9, 10, 11, 12, 13, 18, 19, 21, 22, 23, and 24. FIG. 1 is a diagram showing the appearance of a portable electronic apparatus having a telephoning function employed in all embodiments of the invention. As shown in FIG. 1, this portable electronic apparatus is provided with various keys 1 to be operated by the user, such as a multiple-function push switch 1a, a call key 1b, a power switch 1c, and a reset key 1d, a coordinate entry device 2 that includes an LCD (liquid crystal display) serving as a display device and that provides a pen-based user interface, an infrared communication device 3, a loudspeaker 4 serving as an earpiece, a microphone 5 serving as a mouthpiece, an antenna 6 extendible in the direction indicated by A, and a flap 7 that is fitted to the bottom of the body of the apparatus through a hinge so as to be rotatable in the direction indicated by B and thereby serve to protect the coordinate entry device 2.

Figure 2:
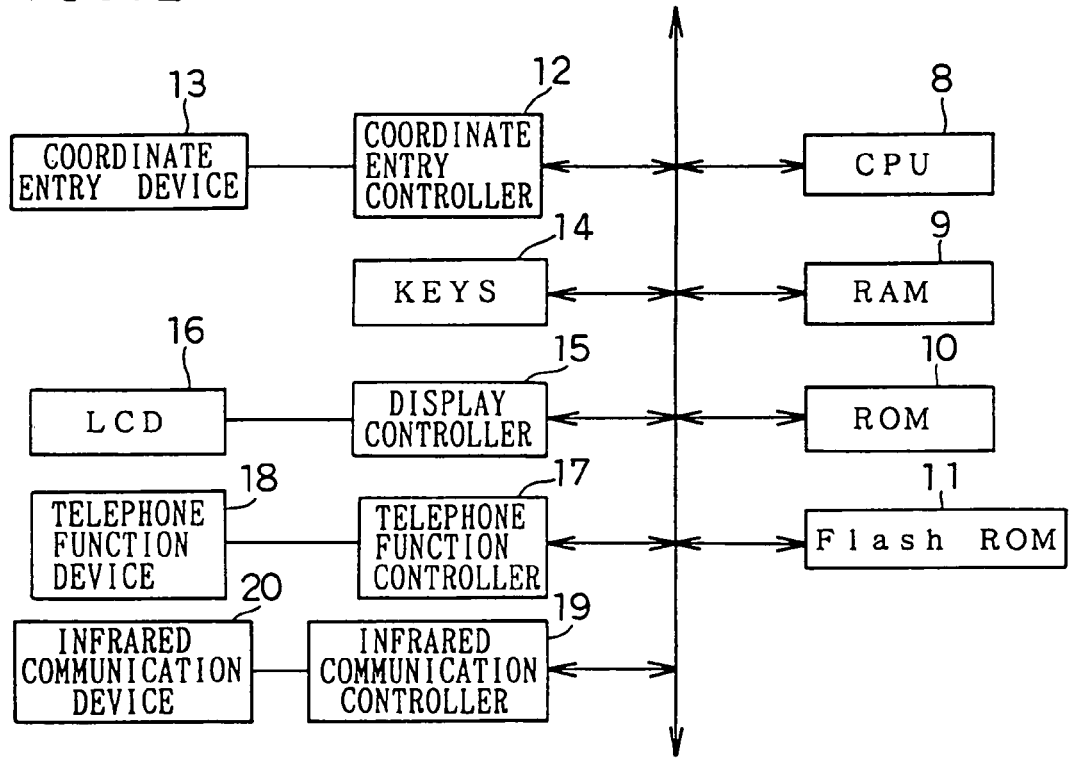
FIG. 2 is a block diagram showing the configuration of the portable electronic apparatus having a telephoning function shown in FIG. 1.

FIG. 2 is a block diagram showing the configuration of the portable electronic apparatus shown in FIG. 1. As shown in FIG. 2, the portable electronic apparatus has a CPU 8 for controlling the entire system and providing various services to the user, a RAM 9 for storing data temporarily, a ROM 10 for storing software and various kinds of data, a flash ROM 11 for storing various kinds of data such as the language and area data of the area for which the apparatus is adapted, a coordinate entry controller 12 that provides a pen-based user interface, a coordinate entry device 13 such as a pen with which to enter data into the coordinate entry controller 12, various keys 14 including the keys 1a to id shown in FIG. 1 to be operated by the user, an LCD 16 serving as a display device, a display controller 15 for controlling the LCD 16, a telephone function device 18 that functions as a telephone, a telephone function controller 17 for controlling the telephone function device 18, an infrared communication device 20, and an infrared communication controller 19 for controlling the infrared communication device 20.

Figure 3:
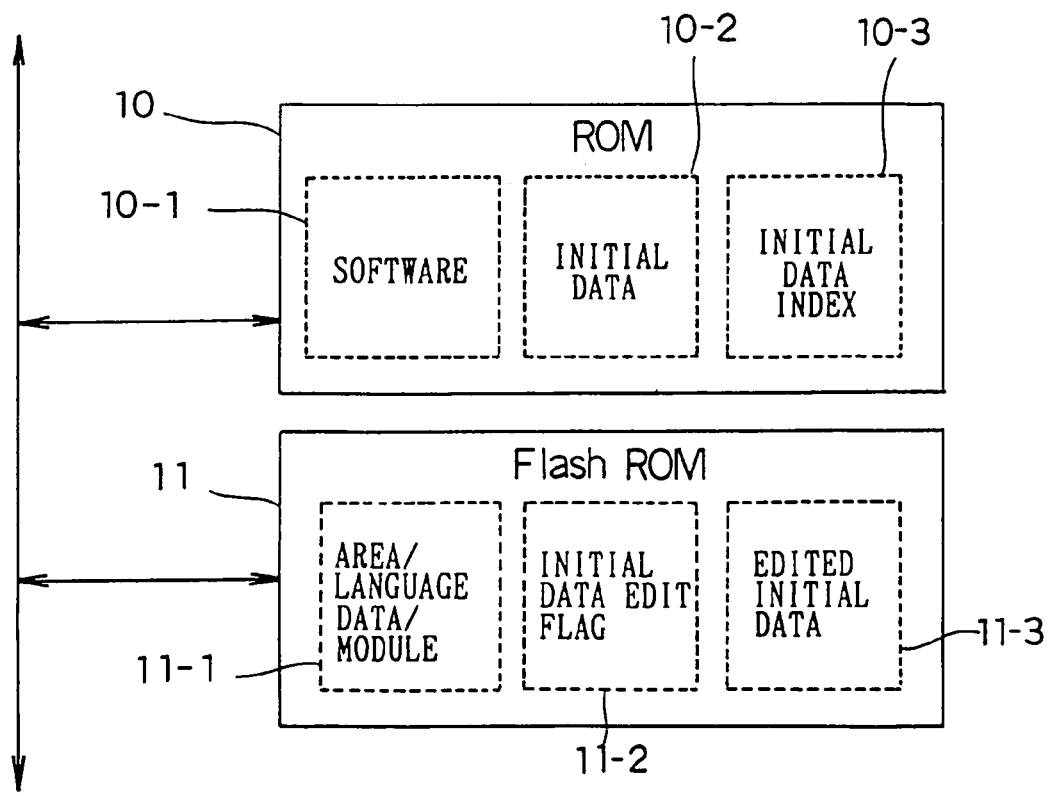
FIG. 3 is a diagram showing the details of the configuration of the ROM and the flash ROM shown in FIG. 1.

FIG. 3 is a diagram showing the details of the configuration of the ROM 10 and the flash ROM 11 shown in FIG. 2. In the ROM 10 are stored software 101 that runs on the portable electronic apparatus, initial data 10-2 that is used to initialize the software 10-1, and an initial data index 10-3 that is used to select from the initial data 10-2 the index to the initial data that is to be used to initialize the software 10-1 according to the area/language data stored in the flash ROM 11. In the flash ROM 11 are stored area/language data 11-1 that is used to initialize the software 10-1 of the portable electronic apparatus, an initial data edit flag that indicates that the user has edited the initial data 11-1 for the initialization of the software 10-1, and edited initial data 11-3 that is the initial data as edited by the user for the initialization of the software 10-1.

In this portable electronic apparatus, various kinds of initial data corresponding to different areas such as the individual states of the U.S.A, England, France, Germany, and Italy, is previously stored in the ROM 10. Out of this initial data, the language and the area data corresponding to the area in which the portable electronic apparatus is going to be used are received by the infrared communication device 20 and the infrared communication controller 19, or entered through an input means such as the coordinate input device 13 or the keys 14, and the received or entered data is stored among the area/language data 11-1 within the flash ROM 11.

Figure 10:
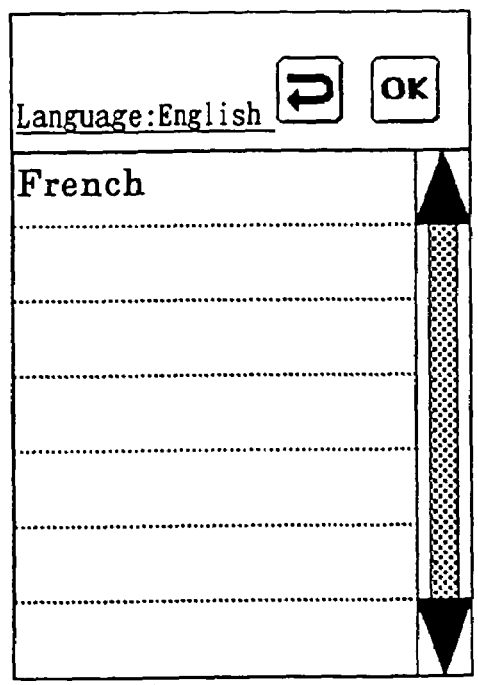
FIG. 10 is a diagram showing a first example of the operation screen (in English) for language setting, common to all of the embodiments of the invention.

In a case where initially the area is set for the U.S.A and the language, is set for English, a screen is displayed as shown in FIG. 8, which shows a first example of the operation screen (in English) for area setting, language setting, and user editing, common to all of the embodiments of the invention. In the upper part of this screen is displayed the currently set area and language data. When the item "Country" is selected from this screen by the use of an input means such as the coordinate entry device 13 or the keys 14, a screen for selecting area data is displayed, with the currently set area data displayed in its upper part, as shown in FIG. 9, which shows a first example of the operation screen (in English) for area setting, common to all of the embodiments of the invention. Here, the area is set, for example, for France by the use of an input means such as the coordinate entry device 13 or the keys 14. Next, when the item "Language" is selected by the use of an input means such as the coordinate entry device 13 or the keys 14, a screen for selecting a language is displayed, with the currently set language displayed in its upper part, as shown in FIG. 10, which shows a first example of the operation screen (in English) for language setting, common to all of the embodiments of the invention. In the example shown in FIG. 10, selection of a language is allowed from among the principal languages associated with the currently set area data; specifically, in this case, since the area is set for France, French is the only item that can be selected.

Figure 4:
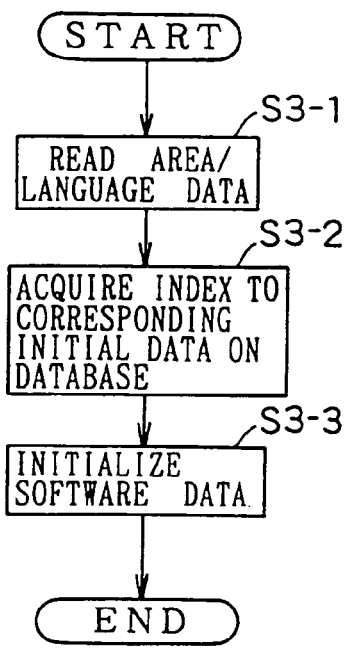
FIG. 4 is a flow chart of the software initialization procedure performed in a first embodiment of the invention.

In this portable electronic apparatus, when the reset key id is pressed, the entire system is initialized. FIG. 4 is a flow chart of the procedure, among other initialization procedures, performed to initialize the data of the software in accordance with the area data and the language set as described above.

In step S3-1, the area data and the language stored among the area and language data within the flash ROM 11 is read out. In step S3–2, the index to the initial data that corresponds to the language and the area data read out in step S3-1 and that is stored within the database stored in the ROM 10 and having a plurality of sets of initial data to cope with a plurality of languages and sets of area data is acquired from the initial data index 10-3. In step S3-3, in accordance with the language and the area data read out in step S3-1, the software is initialized by the use of that part of the initial data 10-2 which is specified by the index acquired in step S3-2.

Figure 12:
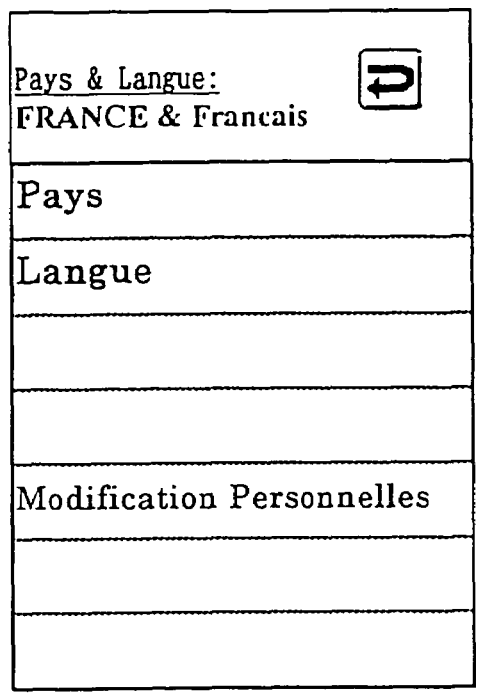
FIG. 12 is a diagram showing a second example of the operation screen (in French) for area setting, language setting, and user editing, common to all of the embodiments of the invention.

As an example of the first embodiment, in a case where the area is set for France and the language is set for French through area and language setting operations as described above, the messages displayed by the software running on the portable electronic apparatus are replaced with messages in French. For example, the first example of the operation screen (in English) for area setting, language setting, and user editing shown in FIG. 8 is displayed in French, as shown in FIG. 12, which shows a second example of the operation screen (in French) for area setting, language setting, and user editing.

Figure 11:
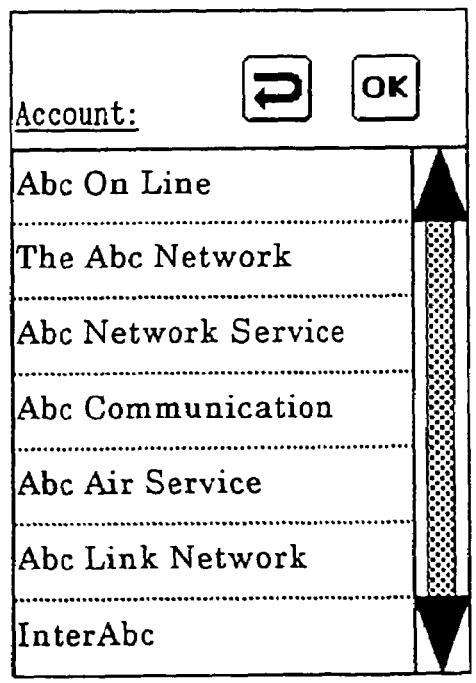
FIG. 11 is a diagram showing a first example of the operation screen (in English) for local Internet provider setting as automatically selected according to the area set, common to all of the embodiments of the invention.
Figure 13:
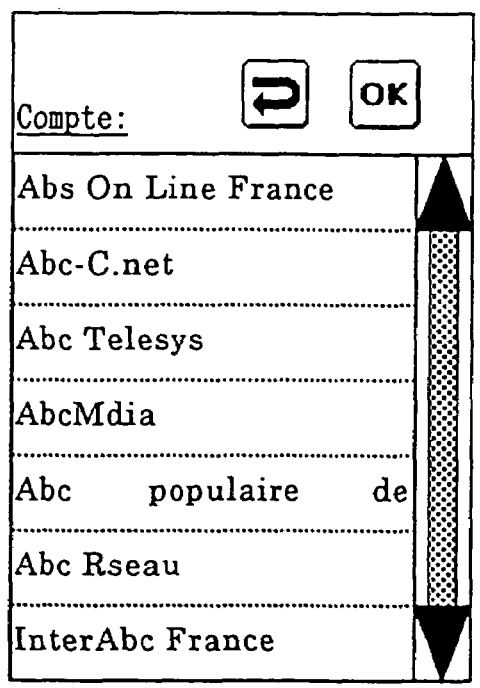
FIG. 13 is a diagram showing a second example of the operation screen (in French) for local Internet provider setting as automatically selected according to the area set, common to all of the embodiments of the invention.

When the area data or the language is changed, not only the language in which messages are displayed, but also the data specific to the area is changed. For example, in a case where initially the area is set for the U.S.A and the language is set for English, in accordance with the currently set area, the typical Internet providers that can be selected for e-mail handling in that area is automatically selected, as shown in FIG. 11, which shows a first example of the operation screen (in English) for local Internet provider setting. In a cases where the area is set for France and the language is set for French, a similar screen is displayed in French, as shown in FIG. 13, which shows a second example of the operation screen (in French) for local Internet provider setting as automatically selected according to the area set. Here, the Internet providers listed are also changed to those that can be selected in that area.

Figure 18:
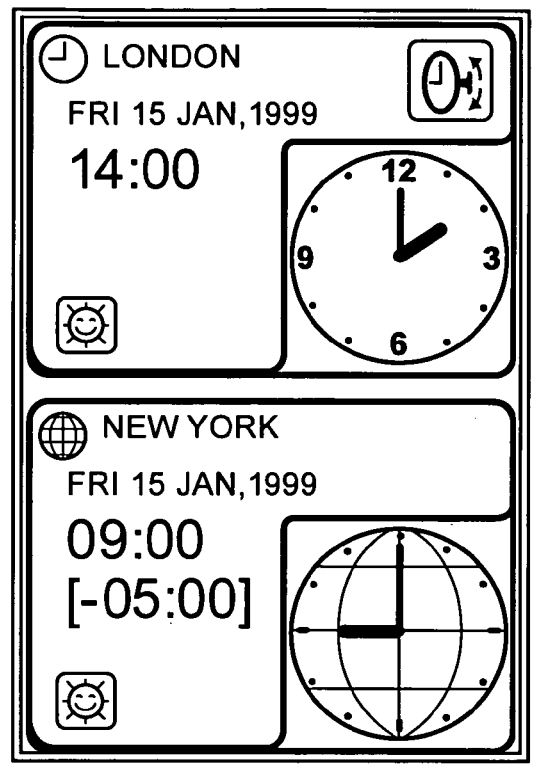
FIG. 18 is a diagram showing a first example of the world clock screen (in English) selected according to the area setting, language setting, and user editing actually made, common to all of the embodiments of the invention.
Figure 19:
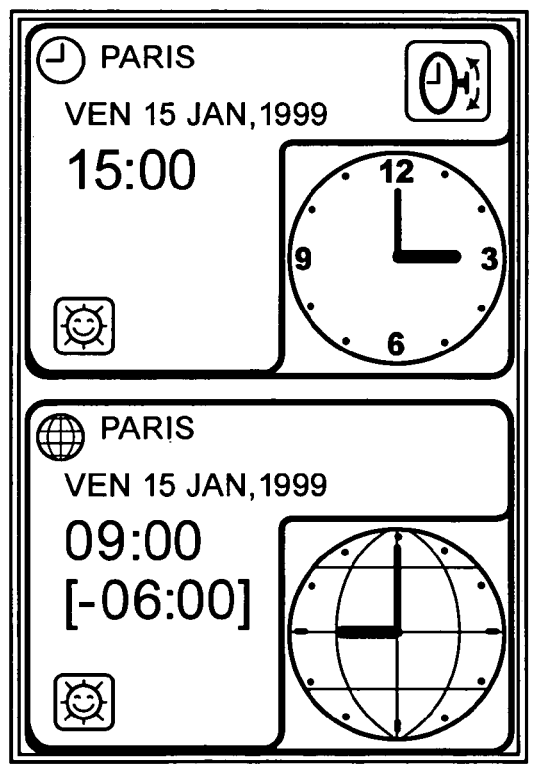
FIG. 19 is a diagram showing a second example of the world clock screen (in French) selected according to the area setting, language setting, and user editing actually made, common to all of the embodiments of the invention.

In the world clock that runs on the portable electronic apparatus, in a case where initially the area is set for the U.S.A. and the language is set for English, the home city is initially set for London, as shown in FIG. 18, which shows a first example of the world clock screen (in English) selected according to the area setting, language setting, and user editing actually made in a case where the area is set for France and the language is set for French, the home city is set for Paris, as shown in FIG. 19, which shows a second example of the world clock screen (in French) selected according to the area setting, language setting, and user editing actually made.

Figure 21:
FIG. 21 is a diagram showing a first example of the outgoing mail creation screen (in English) selected according to the area setting, language setting, and user editing actually made, common to all of the embodiments of the invention.
Figure 22:
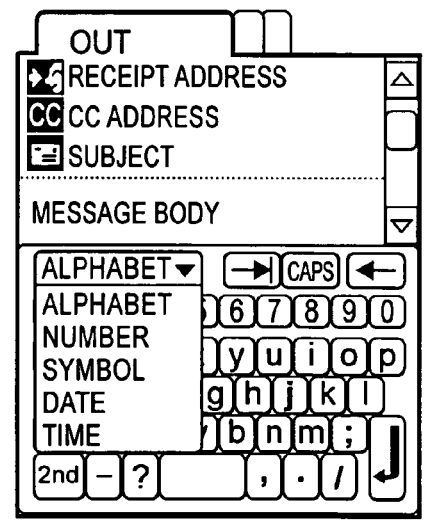
FIG. 22 is a diagram showing a first example of the data-entry software key selection screen (in English) selected according to the area setting, language setting, and user editing actually made, common to all of the embodiments of the invention.

In the mail editing software program that runs on the portable electronic apparatus, in a case where initially the area is set for the U.S.A. and the language is set for English, an input environment, including software keys, is established in English, as shown in FIG. 21, which shows a first example of the outgoing mail creation screen (in English) selected according to the area setting, language setting, and user editing actually made, and in FIG. 22, which shows a first example of the data-entry software key selection screen (in English) selected according to the area setting, language setting, and user editing actually made. In a case where the area is set for France and the language is set for French, an input environment, including software keys, is established in French, as shown in FIG. 23, which shows a second example of the outgoing mail creation screen (in French) selected according to the area setting, language setting, and user editing actually made, and in FIG. 24, which shows a second example of the data-entry software key selection screen (in French) selected according to the area setting, language setting, and user editing actually made.

Second Embodiment

Hereinafter, a second embodiment of the present invention will be described with reference to FIGS. 1, 2, 3, 5, 12, 14, 15, 16, 17, 20, 23, 24, 25, 26, 27, and 28. The portable electronic apparatus having a telephoning function employed in this embodiment has the same appearance as the one employed in the first embodiment shown in FIG. 1.

FIG. 2 is a block diagram showing the configuration of the portable electronic apparatus having a telephoning function shown in FIG. 1. As shown in FIG. 2, the portable electronic apparatus has a CPU 8 for controlling the entire system and providing various services to the user, a RAM 9 for storing data temporarily, a ROM 10 for storing software and various kinds of data, a flash ROM 11 for storing various kinds of data such as the language and area data of the area for which the apparatus is adapted, a coordinate entry controller 12 that provides a pen-based user interface, a coordinate entry device 13 such as a pen with which to enter data into the coordinate entry controller 12, various keys 14 including the keys 1a to id to be operated by the user, an LCD 16 serving as a display device, a display controller 15 for controlling the LCD 16, a telephone function device 18 that functions as a telephone, and a telephone function controller 17 for controlling the telephone function device 18.

FIG. 3 is a diagram showing the details of the configuration of the ROM 10 and the flash ROM 11 shown in FIG. 2. In the ROM 10 are stored software 10-1 that runs on the portable electronic apparatus, initial data 10-2 that is used to initialize the software 10-1, and an initial data index 10-3 that is used to select from the initial data 10-2 the index to the initial data that is to be used to initialize the software 10-1 according to the area/language data stored in the flash ROM 11. In the flash ROM 11 are stored area/language data 11-1 that is used to initialize the software 10-1 of the portable electronic apparatus, an initial data edit flag that indicates that the user has edited the initial data 11-1 for the initialization of the software 10-1, and edited initial data 11-3 that is the initial data as edited by the user for the initialization of the software 10-1.

In the portable electronic apparatus that operates as described above in connection with the first embodiment, an editor function is additionally provided that allows the user to edit the initial data. The initial data as edited by the user is stored in the flash ROM 11 mentioned above. When the edited initial data is stored, the initial data edit flag 11-2 mentioned above is stored as "set". When the initial data is not edited, the flag in the flash ROM 11 is stored as "cleared".

Figure 5:
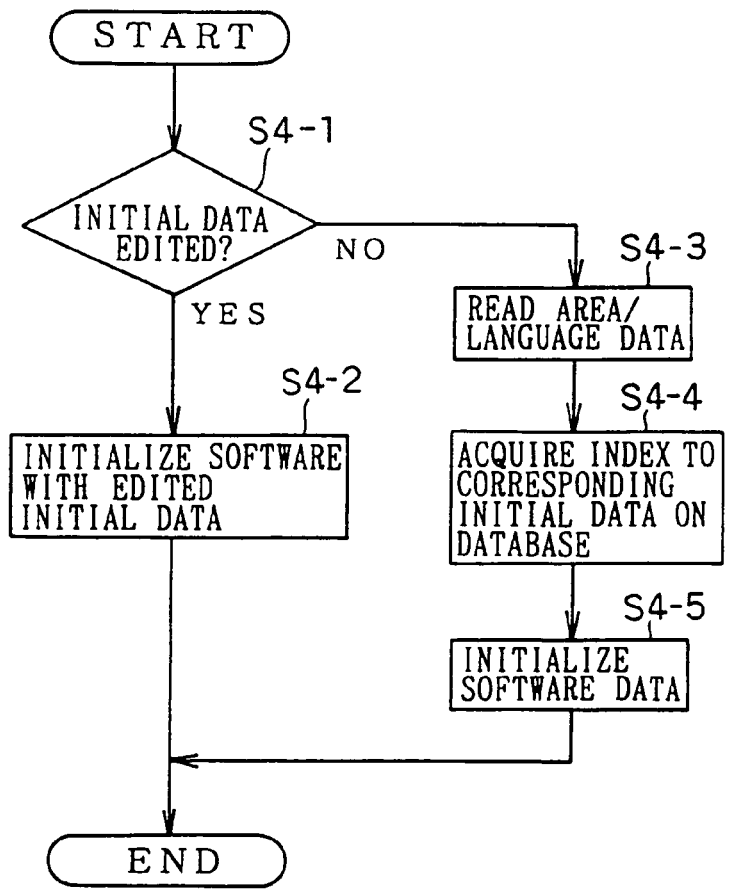
FIG. 5 is a flow chart of the software initialization procedure performed in a second or a fourth embodiment of the invention.

In this portable electronic apparatus, when the reset key id is pressed, the entire system is initialized. FIG. 5 is a flow chart of the procedure, among other initialization procedures, performed to initialize the software by the use of the edited initial data 11-3, i.e. the initial data as edited by the user.

First, in step S4-1, whether the initial data has been edited by the user or not is checked by checking the initial data edit flag 11-2 in the flash ROM 11. If the initial data has been edited, then, in step S4-2, the software 10-1 is initialized by using, as initial data, the initial data 11-3 edited by the user and stored in the flash ROM 11. If the initial data has not been edited, then in steps S4-3, S4-4, and S4-5, the data of the software is initialized by the same procedure as in the first embodiment.

As an example of the second embodiment, in a case where a Frenchman living in France and using Japanese and English in business uses the portable electronic apparatus, it may be necessary, in addition to initializing the system for use in France, to allow the user to configure the system in such a way that not only French but also English and Japanese can be used within the system. In such a case, the item "Modification Personnelles" displayed in FIG. 12, which shows the second example of the operation screen (in French) for area setting, language setting, and user editing, is selected by the use of an input means such as the coordinate input device 13 or the keys 14. As a result, a screen for item selection for user editing is displayed as shown in FIG. 14, which shows a first example of the item selection screen (in French) for user editing.

Figure 14:
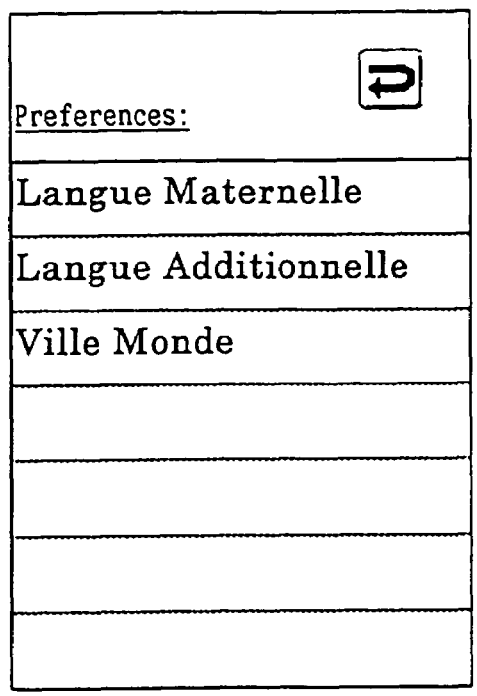
FIG. 14 is a diagram showing a first example of the item selection screen (in French) for user editing, adopted in the second and fifth embodiment.
Figure 15:
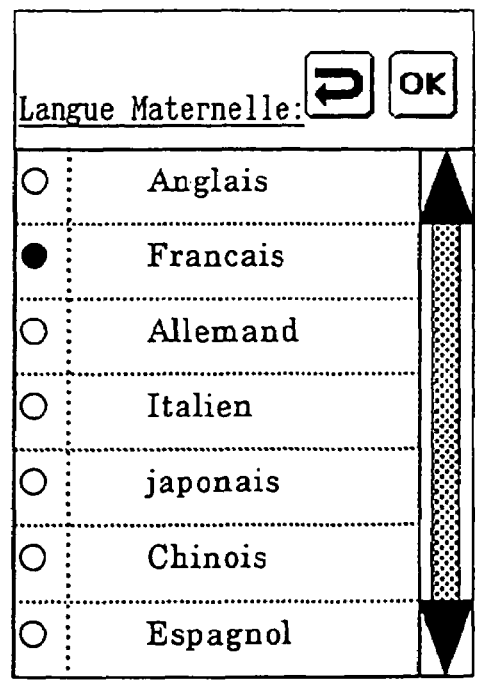
FIG. 15 is a diagram showing a first example of the principal language selection screen (in French) for user editing, adopted in the second and fifth embodiment.

To change the principal language corresponding to the currently set area, i.e. the language in which the software running on the portable electronic apparatus displays various screens, the item "Langue Maternelle" shown in FIG. 14 is selected by the use of an input means such as the coordinate entry device 13 or the keys 14. Then, a screen for selecting a principal language is displayed as shown in FIG. 15, which shows a first example of the principal language selection screen (in French) for user editing.

Figure 16:
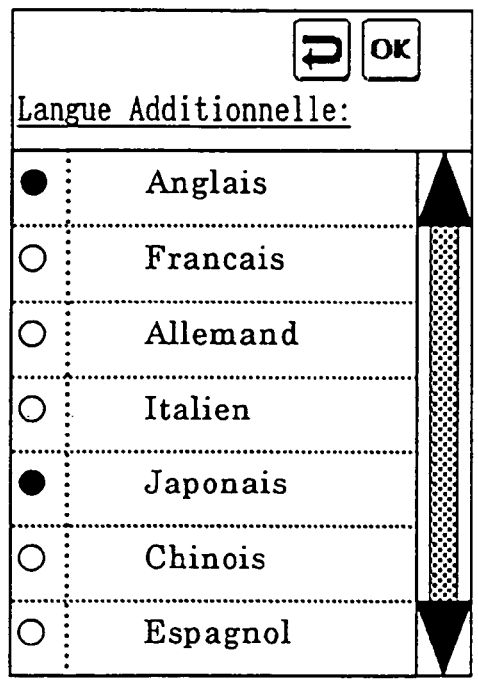
FIG. 16 is a diagram showing a first example of the additional language selection screen (in French) for user editing, adopted in the second and fifth embodiment.

To set English and Japanese as additional languages, the item "Langue Additionele" shown in FIG. 14 is selected by the use of an input means such as the coordinate entry device 13 or the keys 14. Then, a screen for selecting an additional language is displayed as shown in FIG. 16, which shows a first example of the additional language selection screen (in French) for user editing. In FIG. 16, English and Japanese are selected as additional languages by the use of an input means such as the coordinate entry device 13 or the keys 14.

Figure 17:
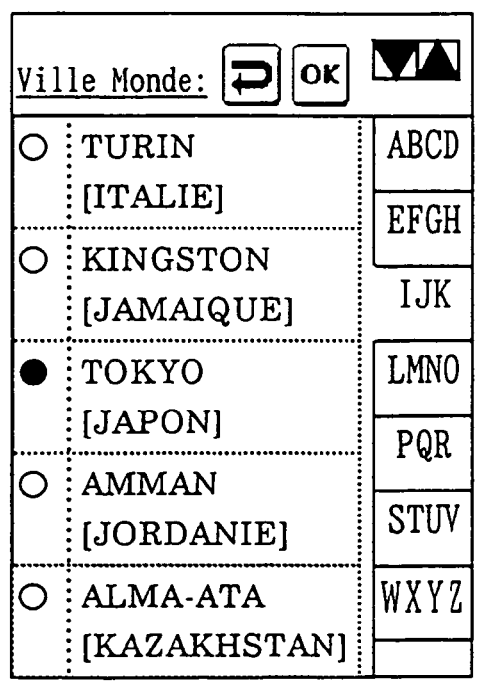
FIG. 17 is a diagram showing a first example of the world city selection screen (in French) for user editing, adopted in the second and fifth embodiment.
Figure 20:
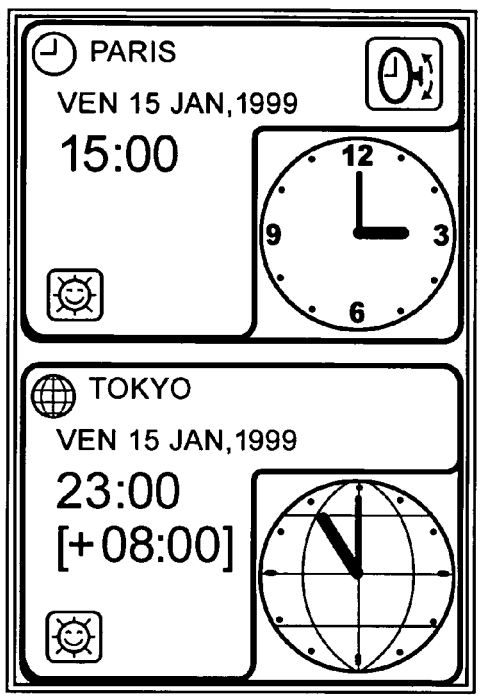
FIG. 20 is a diagram showing a third example of the world clock screen (in French) selected according to the area setting, language setting, and user editing actually made, common to all of the embodiments of the invention.

To change the world city of the world clock, the item "Ville Monde" shown in FIG. 14 is selected by the use of an input means such as the coordinate entry device 13 or the keys 14. Then, a screen for selecting a world city is displayed as shown in FIG. 17, which shows a first example of the world city selection screen (in French) for user editing. In FIG. 14, Tokyo is selected by the use of an input means such as the coordinate entry device 13 or the keys 14. Thereafter, the world clock screen changes to a screen as shown in FIG. 20, which shows a third example of the world clock screen (in French) selected according to the area setting, language setting, and user editing actually made, and, when the software is initialized next time, the world city is changed from New York to Tokyo.

An advantage of setting English and Japanese as additional languages through operations as described above is as follows. If no additional language is set, when mail containing text in Japanese is received, the text in Japanese is not displayed properly in a screen as that shown in FIG. 27, which shows a first example of the incoming mail display screen (if not Japanese-capable) selected according to the area setting, language setting, and user editing actually made. In addition, it is impossible to create mail in Japanese because the software keys that allow entry of Japanese text are not supported in screens as those shown in FIG. 23, which shows the second example of the outgoing mail creation screen (in French) selected according to the area setting, language setting, and user editing actually made, and in FIG. 24, which shows the second example of the data-entry software key selection screen (in French) selected according to the area setting, language setting, and user editing actually made.

Figure 28:
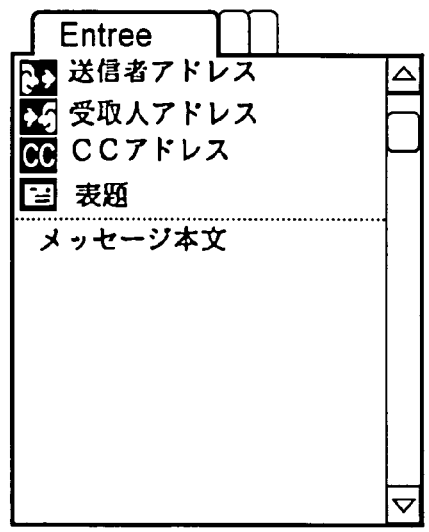
FIG. 28 is a diagram showing a second example of the incoming mail display screen (if Japanese-capable) selected according to the area setting, language setting, and user editing actually made, common to all of the embodiments of the invention.

By contrast, when additional languages are set as described above, received mail containing text in Japanese is displayed properly as shown in FIG. 28, which shows a second example of the incoming mail display screen (if Japanese-capable) selected according to the area setting, language setting, and user editing actually made. In addition, it is possible to create mail in Japanese because the software keys that allow entry of Japanese text are supported in screens as shown in FIG. 25, which shows a third example of the outgoing mail creation screen (if Japanese capable) selected according to the area setting, language setting, and user editing actually made, and in FIG. 26, which shows a third example of the data-entry software key selection screen (if Japanese-capable) selected according to the area setting, language setting, and user editing actually made.

Third Embodiment

Hereinafter, a third embodiment of the present invention will be described with reference to FIGS. 1, 2, 3, and 6. The portable electronic apparatus having a telephoning function employed in this embodiment has the same appearance and the same block configuration as the one employed in the second embodiment shown in FIGS. 1, 2, and 3. Note however that the keys 14 include a delete key 1e shown in FIG. 1 that is operated to delete the initial data edited by the user.

Figure 6:
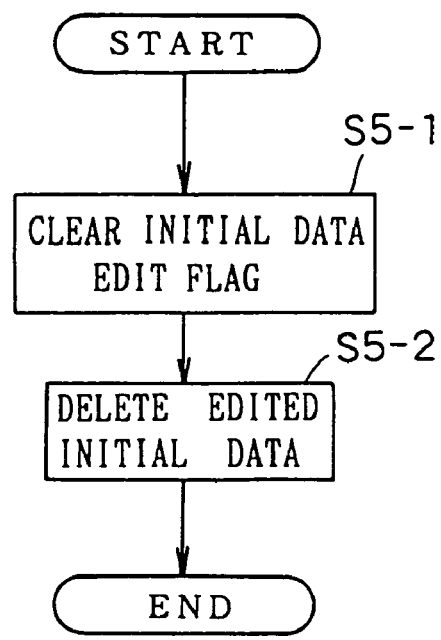
FIG. 6 is a flow chart of the procedure performed to delete the user-edited initial data in a third or the fourth embodiment of the invention.

In the portable electronic apparatus that operates as described above in connection with the second embodiment, it is possible to delete the initial data stored in the flash ROM 11 by pressing the delete key 1e. FIG. 6 shows a flow chart of the procedure performed to achieve this.

First, when the delete key 1e is pressed, then, in step S5-1, the initial data edit flag 11-2 in the flash ROM 11 is stored as "cleared". The initial data edit flag 11-2, when cleared, indicates that the initial data is not edited. Then, in step S5-2, the edited initial data 11-3 as edited by the user and stored in the flash ROM 11 is deleted.

Fourth Embodiment

Hereinafter, a fourth embodiment of the present invention will be described with reference to FIGS. 1, 2, 3, 5, 6, 19, 20, 23, 24, 25, 26, 27, and 28. The portable electronic apparatus having a telephoning function employed in this embodiment has the same appearance and the same block configuration as the one employed in the third embodiment shown in FIGS. 1, 2, and 3.

In the portable electronic apparatus that operates as described above in connection with the third embodiment, when the delete key 1e for deleting the edited initial data 11-3 edited by the user is pressed, according to the procedure shown in the flow chart of FIG. 6, the initial data edit flag 11-2 in the flash ROM 11 is stored as "cleared", then the edited initial data 11-3 as edited by the user and stored in the flash ROM 11 is deleted, and then the entire system is initialized by the use of the initial data as it originally was before user editing according to the procedure shown in the flow chart of FIG. 5.

Figure 27:
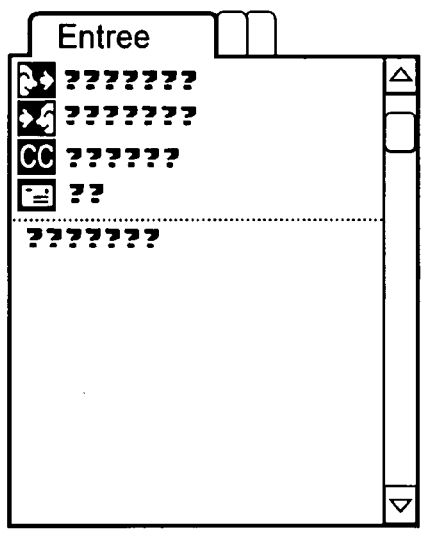
FIG. 27 is a diagram showing a first example of the incoming mail display screen (if not Japanese-capable) selected according to the area setting, language setting, and user editing actually made, common to all of the embodiments of the invention.

As a practical example, consider a case where, as with the second embodiment, the area is set for France, the language is set for French, and English and Japanese are set as additional languages by the user, and Tokyo is set as the world city of the world clock. When the delete key 1e is pressed to reset the system and initialize the software, the world clock screen changes from that shown in FIG. 20, which shows the third example of the world clock screen (in French) as selected in the previously described embodiments, to that shown in FIG. 19, which shows the second example of the world clock screen (in French) as selected in the previously described embodiments. In addition, received mail containing text in Japanese, which has been displayed properly as shown in FIG. 28, which shows the second example of the incoming mail display screen (if Japanese-capable) as selected in the previously described embodiments, is no longer displayed properly as shown in FIG. 27, which shows the first example of the incoming mail display screen (if not Japanese-capable) as selected in the previously described embodiments. Thus, the portable electronic apparatus, when reset, cannot handle Japanese, which is set as an additional language by the user.

Figure 26:
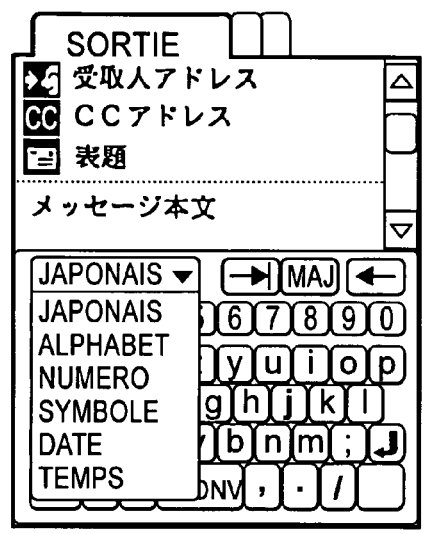
FIG. 26 is a diagram showing a third example of the data-entry software key selection screen (if Japanese-capable) selected according to the area setting, language setting, and user editing actually made, common to all of the embodiments of the invention.

Moreover, the screens related to the creation of mail in Japanese change from those shown in FIG. 25, which shows the third example of the outgoing mail creation screen (if Japanese-capable) as selected in the previously described embodiments and in FIG. 26, which shows the third example of the data-entry software key selection screen (if Japanese-capable) as selected in the previously described embodiments, where the software keys that allow entry of Japanese text are supported, to those shown in FIG. 23, which shows the second example of the outgoing mail creation screen (in French) as selected in the previously described embodiments and in FIG. 24, which shows the second example of the data-entry software key selection screen (in French) as selected in the previously described embodiments, where the software keys that allow entry of Japanese text are not supported. Thus, it is no longer possible to create mail in Japanese.

Fifth Embodiment

Hereinafter, a fifth embodiment of the present invention will be described with reference to FIGS. 1, 2, 3, 4, and 7. The portable electronic apparatus having a telephoning function employed in this embodiment has the same appearance and the same block configuration as the one employed in the fourth embodiment shown in FIGS. 1, 2, and 3.

Figure 7:
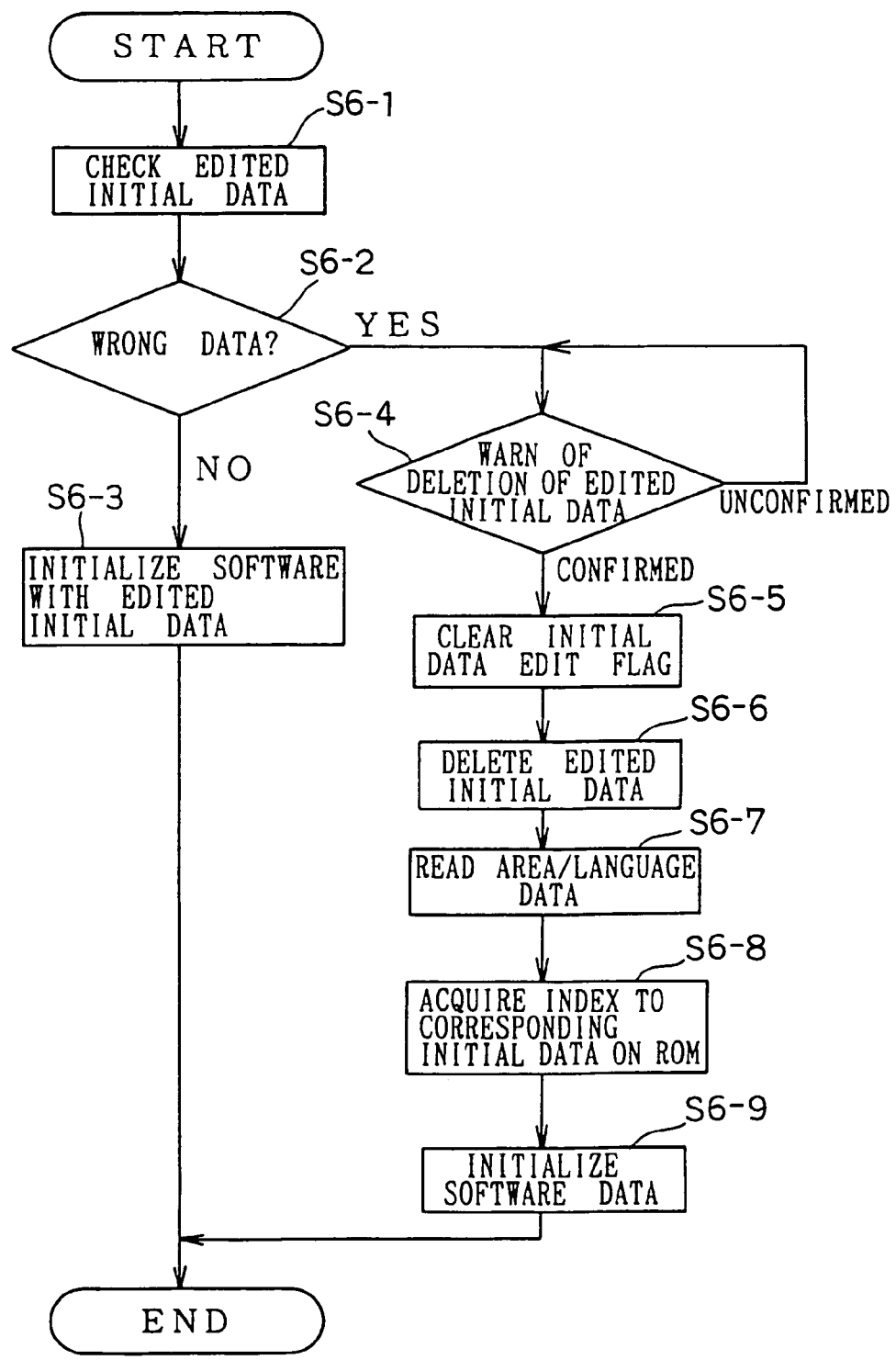
FIG. 7 is a flow chart of the initialization procedure, including steps for detecting incorrect data, performed in a fifth embodiment of the invention.

In the portable electronic apparatus that operates as described above in connection with the fourth embodiment, if the initial data has been edited by the user and is stored as the edited initial data 11-3 in the flash ROM, and the initial data edit flag 11-2 is stored as "set", when the reset key id is pressed, according to the procedure shown in the flow chart of FIG. 7, the entire system is initialized. In FIG. 7, steps S6-2 and S6-4 to S6-9 constitute a flow chart of the procedure for software data initialization, adapted for a case where the initial data as edited by the user is checked for incorrect data.

First, in steps S6-1 and S6-2, the edited initial data 11-3 is checked to see whether there is incorrect data therein or not If no incorrect data is found, then, in step S6-3, initialization is performed according to the flow chart for software initialization shown in FIG. 5 used in either of the second and fourth embodiments. If incorrect data is found, then, in step S6-4, the user is notified that the edited initial data includes incorrect data and is therefore going to be deleted. Then, after confirmation by the user, in step S6-5, the initial data edit flag 11-2 is cleared, and then, in step S6-6, the edited initial data 11-3 is deleted. Thereafter, in steps S6-7, S6-8, and S6-9, initialization is performed by the use of the initial data as it originally was before editing according to the same flow as described in connection with the first embodiment with reference to FIG. 4.

What is claimed is:

1. A portable electronic apparatus incorporating software and having a wireless telephoning function, comprising:

a display for displaying one or more selection screens;

a first memory for storing a plurality of sets of initial data for the software to cope with different countries and languages so that the portable electronic apparatus can utilize initial data corresponding to a country in which the portable electronic apparatus is used and at least a principal language for that country;

input means operable by a user to make selections from the selection screens of a country in which the portable electronic apparatus is being used, a principal language for that country, and an additional language different than the principal language; and a second memory for storing data identifying the user-selected country, the user-selected principal language, and the user-selected additional language, wherein, when the software is initialized, initial data corresponding to the user-selected country, the user-selected principal language, and the user-selected additional language identified by the data stored in the second memory is selected from the initial data stored in the first memory, wherein the portable electronic apparatus further comprises editing means operable by the user to edit the user-selected country, the user-selected principal language and/or the user-selected additional language, and data identifying the edited selections is stored in the second memory, wherein the portable electronic apparatus further comprises a key that is operated to delete the edited selections and, when the key is operated, the edited selections are deleted and the software is initialized by use of data identifying the country, the principal language and the additional language selected by the user prior to the editing, and wherein, when the software of the portable electronic apparatus is initialized by use of the data identifying the edited selections, the edited selections are checked so that, if incorrect data is found therein, the data identifying the edited selections is automatically deleted and the software is initialized by use of data identifying the country, the principal language and the additional language selected by the user prior to the editing.

2. A portable electronic apparatus incorporating software and having a wireless telephoning function, comprising:

a first memory area for storing software;

a second memory area for storing a plurality of sets of initial data for the software corresponding to countries in which the portable electronic apparatus can be used and principal languages for those countries so that the portable electronic apparatus is usable in a plurality of countries and languages;

a third memory area for storing an index to the initial data;

a display for displaying one or more selection screens;

input means operable by a user to make selections from the selection screens of a country in which the portable electronic apparatus is being used, a principal language for that country, and an additional language different than the principal language;

a fourth memory area for storing country and language data used to initialize the software;

a fifth memory area for storing a flag indicating the selection of the country, the principal language, or the additional language using the input means; and a sixth memory area for storing data identifying the country, the principal language, and the additional language which are selected using the input means, wherein, when the flag in the fifth memory area is not set, the portable electronic apparatus reads out the country and language data from the fourth memory area, acquires from the third memory area an index to the initial data corresponding to the read-out country and language data, and initializes the software in the first memory area by using the initial data specified by the index and stored in the second memory area, and wherein when the flag in the fifth memory area is set, the portable electronic apparatus initializes the software in the first memory area by using the country, the principal language, and the additional language identified by the data in the sixth memory area and wherein, when the software of the portable electronic apparatus is initialized by using the country, the principal language and the additional language identified by the data in the sixth memory area, the data in the sixth memory area is checked so that, if incorrect data is found therein, the data in the sixth memory area is automatically deleted and the software is initialized by use of the country and language data in the fourth memory area.

3. A portable electronic apparatus as claimed in claim 2, further comprising:

a key that is operated to delete the data selected using the input means.

4. The portable electronic apparatus as claimed in claim 1, wherein the one or more selection screens comprise a country selection screen identifying one or more countries for selection using the input means.

5. The portable electronic apparatus as claimed in claim 1, wherein the one or more selection screens comprise a principal language selection screen identifying one or more principal languages for selection using the input means.

6. The portable electronic apparatus as claimed in claim 2, wherein the one or more selection screens comprise a country selection screen identifying one or more countries for selection using the input means.

7. The portable electronic apparatus as claimed in claim 2, wherein the one or more selection screens comprise a principal language selection screen identifying one or more principal languages for selection using the input means.

* * * * *